United States Patent
Jabori et al.

(10) Patent No.: US 7,447,824 B2
(45) Date of Patent: Nov. 4, 2008

(54) DYNAMIC LANE MANAGEMENT SYSTEM AND METHOD

(75) Inventors: Monji G. Jabori, Houston, TX (US); Rahul V. Lakdawala, Cypress, TX (US); Qijun Chen, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 74 days.

(21) Appl. No.: 11/259,284

(22) Filed: Oct. 26, 2005

(65) Prior Publication Data

US 2007/0094437 A1    Apr. 26, 2007

(51) Int. Cl.
*G06F 13/00* (2006.01)
(52) U.S. Cl. .................. 710/307; 710/301; 710/302
(58) Field of Classification Search .......... 710/301, 710/302, 307
See application file for complete search history.

(56) References Cited

U.S. PATENT DOCUMENTS

| | | | |
|---|---|---|---|
| 6,138,194 A * | 10/2000 | Klein et al. | 710/302 |
| 6,590,432 B1 | 7/2003 | Wu et al. | |
| 7,136,953 B1 * | 11/2006 | Bisson et al. | 710/307 |
| 2004/0088469 A1 | 5/2004 | Levy | |
| 2004/0103333 A1 | 5/2004 | Martwick et al. | |
| 2005/0206345 A1 * | 9/2005 | Maskatia et al. | 320/132 |
| 2005/0283561 A1 * | 12/2005 | Lee et al. | 710/307 |
| 2006/0023633 A1 * | 2/2006 | Caruk et al. | 370/252 |
| 2007/0067548 A1 * | 3/2007 | Juenger | 710/315 |
| 2007/0094436 A1 * | 4/2007 | Keown et al. | 710/307 |

* cited by examiner

*Primary Examiner*—Glenn A Auve

(57) ABSTRACT

A dynamic lane management system comprises at least one downstream device of a computer system configured to dynamically initiate a lane width re-negotiation operation with at least one upstream device of the computer system in response to a detection of at least one power-related event associated with the computer system.

32 Claims, 3 Drawing Sheets

US 7,447,824 B2

DYNAMIC LANE MANAGEMENT SYSTEM AND METHOD

BACKGROUND OF THE INVENTION

An increasing number of computer devices, such as portable laptop or notebook computers, handheld computing devices, desktop computers, etc., are utilizing a peripheral component interconnect (PCI) express high-speed serial input/output (I/O) bus to take advantage of high bandwidth and low latency. However, the PCI express architecture itself consumes power. Thus, the additional power consumption of the PCI express architecture can adversely affect battery life (e.g., for a portable computing device), cause an increased load on thermal energy dissipation systems and/or detracts from the amount of power available for other systems and/or applications.

BRIEF DESCRIPTION OF THE DRAWINGS

For a more complete understanding of the present invention and the advantages thereof, reference is now made to the following descriptions taken in connection with the accompanying drawings in which.

DETAILED DESCRIPTION OF THE DRAWINGS

The preferred embodiments of the present invention and the advantages thereof are best understood by referring to FIGS. 1-5 of the drawings, like numerals being used for like and corresponding parts of the various drawings.

Figure 1:
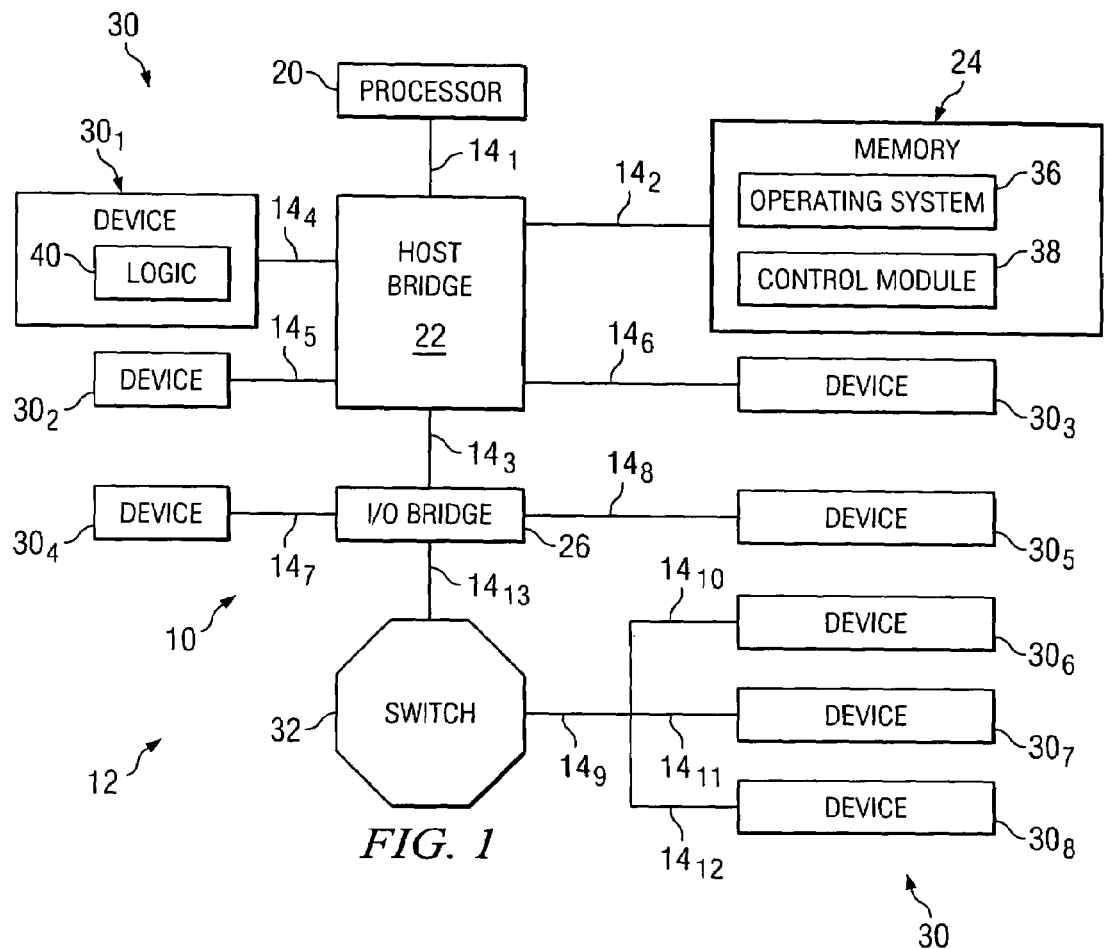
FIG. 1 is a block diagram illustrating an embodiment of a dynamic lane management system in accordance with the present invention.

FIG. 1 is a diagram illustrating an embodiment of a dynamic lane management system 10 in accordance with the present invention. In the embodiment illustrated in FIG. 1, system 10 is implemented in a computer system 12 configured to utilize peripheral component interconnect (PCI) express buses and/or lanes 14. In the embodiment illustrated in FIG. 1, computer system 12 comprises a processor 20 communicatively coupled to a host bridge 22 by PCI express bus $14_1$, a memory 24 communicatively coupled to host bridge 22 by PCI express bus $14_2$, and an input/output (I/O) bridge 26 communicatively coupled to host bridge 22 by PCI express bus $14_3$. In the embodiment illustrated in FIG. 1, devices 30 are communicatively coupled by PCI express buses 14 to host bridge 22 and/or I/O bridge 26, respectively. For example, in the embodiment illustrated in FIG. 1, device $30_1$, $30_2$, and $30_3$ are communicatively coupled to host bridge 22 by respective PCI express buses $14_4$, $14_5$ and $14_6$. Devices $30_4$ and $30_5$ are communicatively coupled to I/O bridge 26 by respective PCI buses $14_7$ and $14_8$. Further, devices $30_6$, $30_7$ and $30_8$ are communicatively coupled to a switch 32 by PCI express bus $14_9$ by respective PCI express bus branches $14_{10}$, $14_{11}$ and $14_{12}$, and switch 32 is communicatively coupled to I/O bridge 26 via PCI express bus $14_{13}$. Devices 30 may comprise any type of device such as, but not limited to, a hard disk drive (HDD), a graphics module or subsystem, local input/output interface(s), an Ethernet interface, a docking station or any other type of peripheral and/or non-peripheral device or component. It should also be understood that the architecture and/or resource functions of system 10 may be otherwise configured (e.g., host bridge 22 may be formed as part of and/or otherwise incorporated into processor 20, memory 24 may be formed as part of and/or otherwise incorporated into processor 20, etc.).

In the embodiment illustrated in FIG. 1, memory 24 comprises an operating system 36 and a control module 38. Operating system 36 and/or control module 38 may comprise hardware, software, or a combination of hardware and software. In the embodiment illustrated in FIG. 1, operating system 36 and control module 38 are illustrated as being stored in memory 24 so as to be accessible and executable by processor 20. However, it should be understood that operating system 36 and/or control module 38 may be otherwise stored.

In the embodiment illustrated in FIG. 1, device $30_1$ comprises logic 40 which may comprise software, hardware, or a combination of software and hardware. For ease of illustration, logic 40 is illustrated only with respect to device $30_1$. However, it should be understood that additional and/or all devices 30, memory 24, switch 32, I/O bridge 26 and/or host bridge 22 may be configured having logic 40 in accordance with the present invention. In operation, control module 38 and/or logic 40 are used to dynamically control, manage and/or otherwise adjust a PCI express bus lane width between two devices (e.g., an upstream device and a downstream device). It should be understood that in a PCI express architecture, each link and/or lane between two devices comprises an "upstream" facing port and a "downstream" facing port. Further, it should be understood that as used herein, an "upstream" device or "downstream" device may comprise any of devices 30, switch 32, I/O bridge 26, host bridge 22, processor 20 or memory 24.

Embodiments of the present invention dynamically control, manage and/or otherwise change a lane width (i.e., the number of lanes) between an upstream device and a downstream device in response to at least one power-related event associated with computer system 12. For example, in some embodiments of the present invention, in response to detecting an increased temperature of computer system 12 (e.g., as a result of operation of a high performance application or module, a blocked cooling vent, a malfunctioning fan, etc.), a lane width of one or more PCI express buses are reduced to reduce thermal energy generation by computer system 12. In other embodiments of the present invention, a lane width between one or more upstream and downstream devices is dynamically reduced in response to detecting a change in a power supply mode to computer system 12. For example, to conserve battery life and/or power, in response to detecting a change from alternating current (AC) power to direct current (DC) power, a lane width between one or more upstream and downstream devices is dynamically reduced to a predetermined or desired level, thereby reducing the power consumption associated with such PCI express buses. In yet another embodiment of the present invention, in response to detecting a decreased processing level of a particular device of system 12 (e.g., a device remaining idle for a predetermined period of time awaiting a processing task), a lane width between the subject downstream device and an upstream device is dynamically reduced to a predetermined or desired level, thereby reducing the power associated with the PCI express bus connected to the subject device. It should be understood that a lane width of one or more PCI express buses may also be dynamically increased in response to detecting a change in at least one power-related event. For example, in response to detecting a change from a DC power supply mode to an AC power supply mode, reduced operating temperature, increased processing level, etc. Moreover, in some embodiments of the present invention, dynamic PCI express bus lane width management is performed in response to user input.

In one embodiment of the present invention, control module 38 is configured to monitor a power supply condition and/or mode applied to computer system 12 (e.g., AC power or battery power). In response to detecting a change in a power supply mode to computer system 12, control module 38 communicates with operating system 36 such that operating system 36 notifies one or more downstream devices of the power supply mode change event. In some embodiments of the present invention, control module 38 and/or operating system 36 registers particular devices for receiving a notification of a power-related event for dynamically adjusting a corresponding PCI express bus lane width associated with the registered device. For example, in some embodiments of the present invention, particular devices that generally consume large amounts of power (e.g., graphics-intensive applications) and/or devices that may be throttled and/or otherwise adjusted to change a power consumption mode are registered, either as a default or predetermined device listing and/or in response to a user designation of such devices, to receive a notification of the power-related event.

In one embodiment of the present invention, control module 38 and/or operating system 36 transmits a signal and/or otherwise notifies registered devices (e.g. device $30_1$) of detection of a power-related event. In response to notification of the power-related event, logic 40 dynamically changes a PCI express bus lane width between the notified device and an upstream device (e.g., between device $30_1$, and host bridge 22). In some embodiments of the present invention, logic 40 is configured to perform a lane width re-negotiation operation in response to receiving notification of the power-related event. For example, in response to device $30_1$ receiving notice of the power-related event, logic 40 initiates a PCI express bus lane width re-negotiation operation with host bridge 22 to increase or decrease a lane width between host bridge 22 and device $30_1$. For example, in response to detecting any change in power supply mode to computer system 12, logic 40 is configured to initiate a lane width re-negotiation operation to reduce or increase a PCI bus express lane width between device $30_1$ and host bridge 22. Thus, in response to detecting a change from AC power to DC power, a lane width between one or more upstream and downstream devices is dynamically reduced to a predetermined or desired level, and in response to detecting a change from DC power to AC power, a lane width between one or more upstream and downstream devices is dynamically increased to a predetermined or desired level.

In operation, for PCI express bus $14_4$ between host bridge 22 (the upstream device) and device $30_1$ (the downstream device) for example, logic 40 initiates the lane width re-negotiation operation with host bridge 22 by initially completing any pending transactions or events in queue at device $30_1$. In response to completing any pending transactions at device $30_1$, logic 40 causes any registers of device $30_1$ and a state of device $30_1$ to be saved to enable device $30_1$ to resume operations upon completion of the lane width re-negotiation operation. In response to device $30_1$ saving device $30_1$ registers and state, device $30_1$ transmits a signal to the upstream device host bridge 22 to initiate a lane width re-negotiation with host bridge 22. In some embodiments of the present invention, the signal transmitted by device $30_1$ to host bridge 22 comprises a hot reset signal, thereby causing a lane width re-negotiation for all devices that are on the same PCI express bus branch. In other embodiments of the present invention, device $30_1$ transmits a retrain link signal to re-negotiate a lane width only for the PCI express bus lane between device $30_1$ and host bridge 22. In operation, logic 40 performs and/or otherwise communicates with host bridge 22 during the lane width re-negotiation operation using a reduced and/or increased lane width depending on the power-related event (e.g., a reduced lane width to save power).

In some embodiments of the present invention, a reduced lane width comprises a predetermined lane width based on the type of power-related event. For example, in some embodiments of the present invention, the lane width may be reduced to a single lane for maximum battery power saving. In other embodiments of the present invention, the lane width may be reduced to a lane width between a maximum and minimum lane width and/or a lane width requested and/or otherwise desired by a user. For example, in some embodiments of the present invention, a user may input and/or otherwise indicate to computer system 12 either a desired lane width and/or a desired level of power saving such that a desired power saving mode corresponds to a predetermined lane width (e.g., a desired amount of battery time correlated to a predetermined lane width). Thus, for example, if a user desires to have maximum power saving, the lane width may be reduced to a single lane. However, for a power saving mode of fifty percent, for example, a lane width may be reduced from sixteen lanes to eight lanes.

In operation, logic 40 performs the lane width re-negotiation operation with host bridge 22 using a predetermined quantity of PCI express bus lanes. For example, logic 40 is configured to perform the lane width re-negotiation operation using a single PCI express bus lane for achieving a maximum power saving, thereby conserving and/or otherwise extending battery life. Thus, for example, during a lane width re-negotiation operation between device $30_1$ and host bridge 22 for maximum power saving, device $30_1$ re-negotiates the lane width of PCI express bus $14_4$ using a single lane. It should be understood that dynamic lane width re-negotiation may be performed on any of the PCI express busses 14 and may be initiated by either an upstream device or a downstream device.

Figure 2:
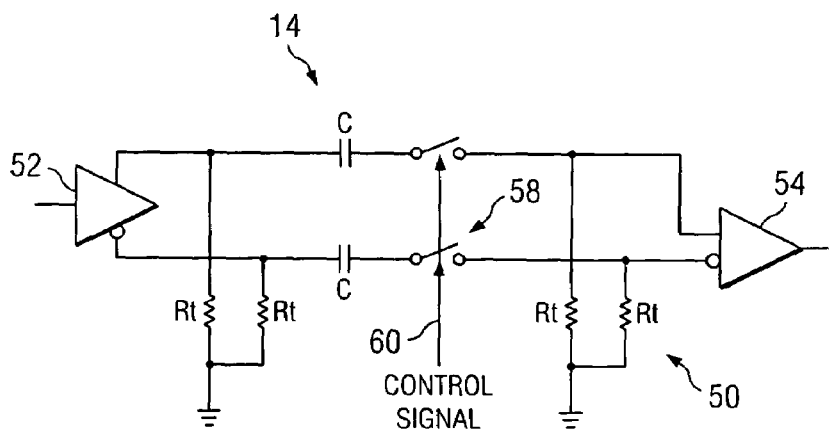
FIG. 2 is a circuit diagram illustrating an embodiment of a dynamic lane management system in accordance with the present invention.

FIG. 2 is a circuit diagram representing a single PCI express lane bus 14 of system 12 employing an embodiment of dynamic lane management in accordance with the present invention. In the embodiment illustrated in FIG. 2, a hardware-based implementation for dynamically managing a lane width re-negotiation operation between an upstream device and a downstream is illustrated. For example, in the embodiment illustrated in FIG. 2, a circuit 50 comprises a driver 52 associated with a downstream device (e.g., device $30_1$) and a driver 54 associated with an upstream device (e.g., host bridge 22). In the embodiment illustrated in FIG. 2, circuit 50 comprises a switch 58 coupled to each data flow path of lane 14 (e.g., the upstream and downstream data flow lanes). In operation, a control signal issued by logic 40, control module 38 and/or operating system 36 is used to actuate switch 58 to connect or disconnect lane 14 such that during a lane width re-negotiation operation, the PCI express lane bus 14 of FIG. 2 is either available or unavailable, respectively. Thus, if switch 58 disconnects the PCI express lane bus 14 of FIG. 2, a reduced lane width is used during the lane width negotiation operation, thereby resulting in a lane width reduction between an upstream device and a downstream device. However, it should be understood that other software-based and/or hardware-based methods may be used to increase or decrease a lane width used during a lane width re-negotiation operation (e.g., disabling a data receipt or input buffer of a device, thereby causing the device not to detect the presence of a particular lane).

Figure 3:
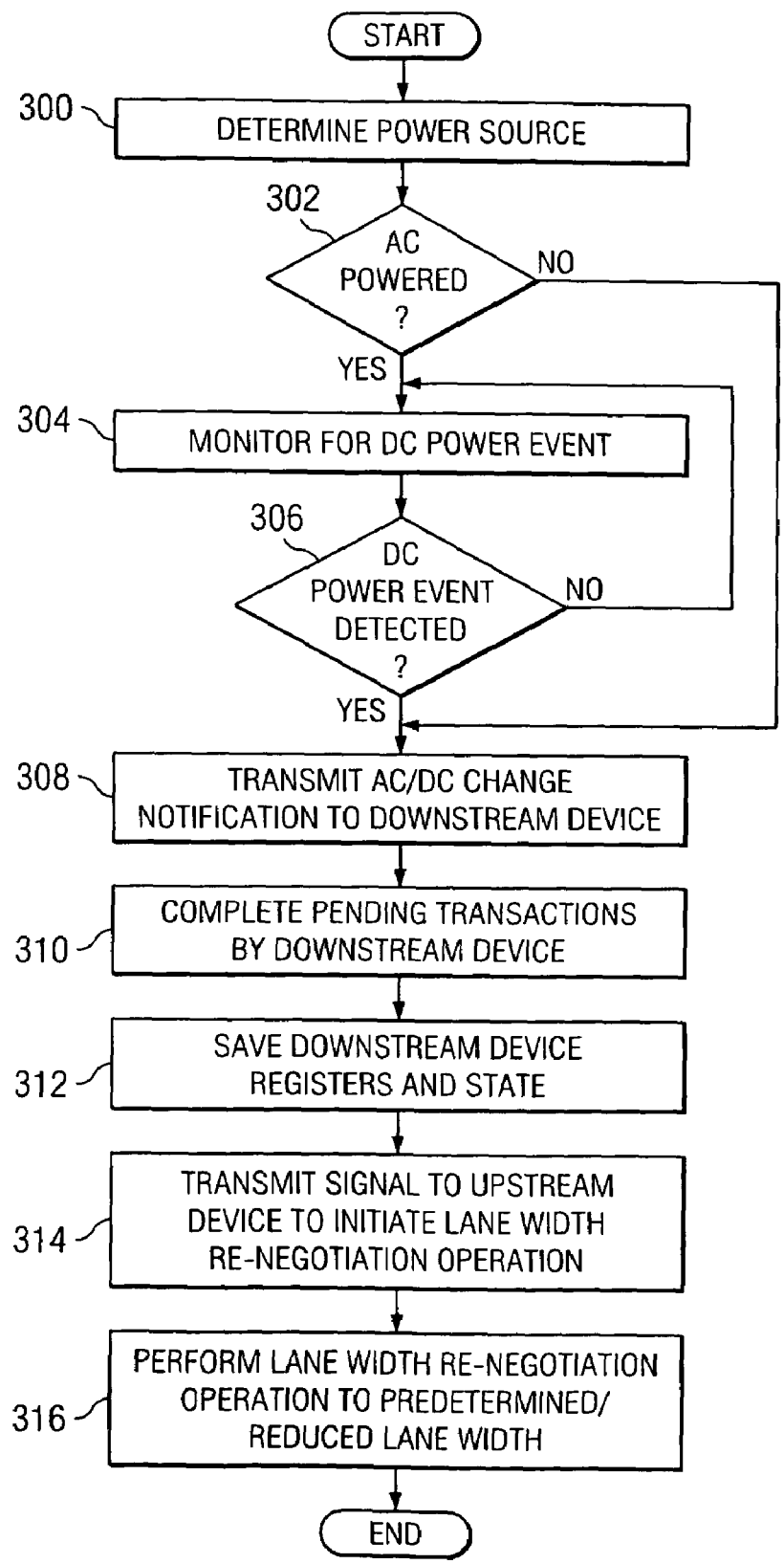
FIG. 3 is a flow diagram illustrating an embodiment of a dynamic lane management method in accordance with the present invention.

FIG. 3 is a flow diagram illustrating an embodiment of a dynamic lane management method in accordance with the present invention. The method begins at block 300, where control module 38 determines a source of power supply for computer system 12. At decisional block 302, a determination is made whether computer system 12 is powered by an AC power supply. If computer system 12 is not currently powered by an AC power supply (e.g., powered by a battery source), the method proceeds to block 308. If computer system 12 is currently powered by an AC power supply, the method proceeds to block 304, where control module 38 monitors computer system 12 for a power-related event (e.g., a DC-power event). For example, a DC-power event may comprise a change from an AC power supply to a DC power supply resulting from disconnection of computer system 12 from an external power supply outlet, an AC adaptor, or other source of AC power. At decisional block 306, a determination is made whether a DC-power event has been detected. If a DC-power event has not been detected, the method proceeds to block 304. If a DC-power event has been detected, the method proceeds to block 308.

At block 308, control module 38 transmits a power-related event change notification to at least one downstream device. For example, control module 38 may transmit a power-related event notification to any device registered to receive such notification (e.g., device 30₁) and/or all available devices At block 310, the downstream device completes pending transactions. At block 312, the downstream device saves device registers and a state of the downstream device. At block 314, the downstream device transmits a signal to an upstream device to initiate a lane width re-negotiation operation (e.g., a hot reset, link re-train or other type of lane width re-training signal). At block 316, the lane width re-negotiation operation is performed to reduce a lane width between the upstream and downstream device to a predetermined and/or reduced lane width. In the embodiment illustrated in FIG. 3, the lane width is dynamically reduced in response to detecting a change from AC power to DC power. However, it should be understood that in response to detecting a change from DC power to AC power, control module 38 transmits a power-related event change notification to at least one downstream device and, in response to the power-related event change notification, the downstream device completes pending transactions, saves device registers and a state of the downstream device, and transmits a signal to an upstream device to initiate a lane width re-negotiation operation (e.g., a hot reset, link re-train or other type of lane width re-training signal) to increase a lane width between the upstream and downstream device.

Figure 4:
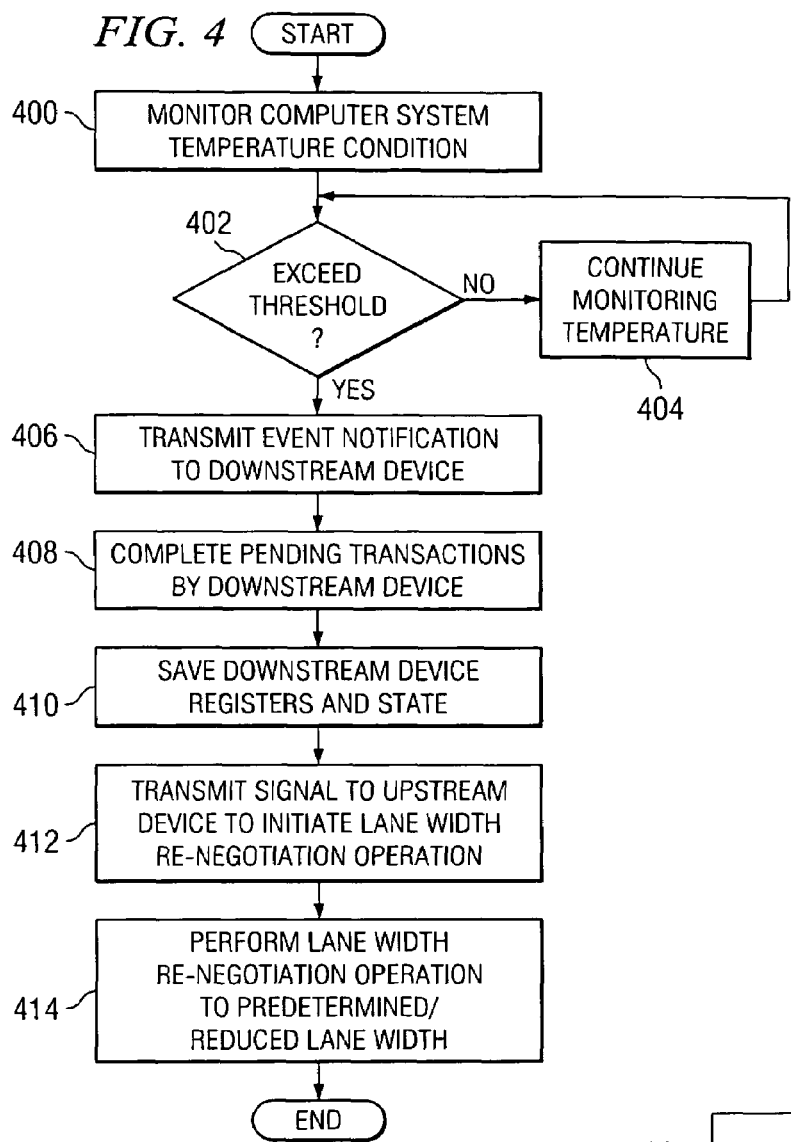
FIG. 4 is a flow diagram illustrating another embodiment of a dynamic lane management method in accordance with the present invention.

FIG. 4 is a flow diagram illustrating another embodiment of a dynamic lane management method in accordance with the present invention. The method begins at block 400, where control module 38 monitors a temperature condition of computer system 12 (e.g., a temperature condition of computer system 12 associated with thermal energy dissipation by computer system 12). At decisional block 402, a determination is made whether a temperature of computer system 12 has exceeded a predetermined threshold. If the temperature of computer system 12 has not exceeded a predetermined threshold, the method proceeds to block 404, where a control module 38 continues monitoring the temperature of computer system 12. If a temperature of computer system 12 has exceeded a predetermined threshold, the method proceeds to block 406, where a control module 38 and/or operating system 36 transmits an event notification signal to at least one downstream device.

At block 408, the notified downstream device completes pending transactions. At block 410, the notified downstream device saves registers and a state of the downstream device. At block 412, the downstream device transmits a signal to an upstream device to initiate a lane width re-negotiation operation to modify a quantity of PCI express bus lanes 14 between the downstream device and the upstream device. As discussed above, the signal transmitted by the downstream device may comprise a hot reset signal, a link re-train signal or other type of signal used to initiate a lane width re-training between the downstream and upstream device. At block 414, the lane width re-negotiation operation is performed using a predetermined and/or reduced lane width between the downstream device and the upstream device. In the embodiment illustrated in FIG. 4, the lane width is preferably reduced to a predetermined quantity to reduce the thermal condition of the computer system 12. However, it should be understood that in response to detecting a decrease in the temperature condition of computer system 12, control module 38 and/or operating system 36 transmits an event notification signal to at least one downstream device and, in response to the signal, the notified downstream device completes pending transactions, saves registers and a state of the downstream device, and transmits a signal to an upstream device to initiate a lane width re-negotiation operation to increase a quantity of PCI express bus lanes 14 between the downstream device and the upstream device.

Figure 5:
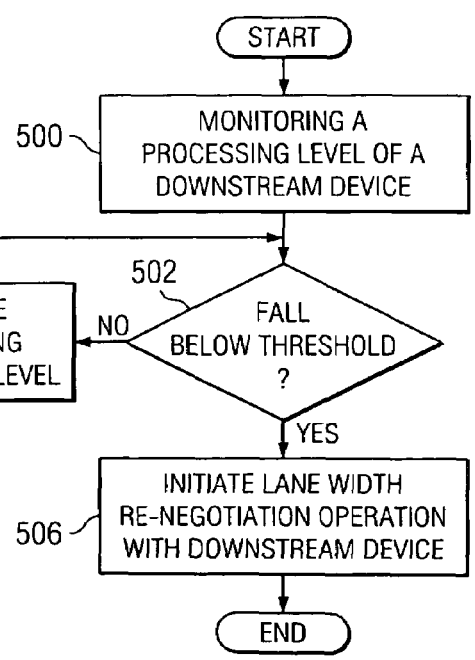
FIG. 5 is a flow diagram illustrating yet another embodiment of a dynamic lane management method in accordance with the present invention.

FIG. 5 is a flow diagram illustrating yet another embodiment of a dynamic lane management method in accordance with the present invention. The method begins at block 500, where control module 38, operating system 36 and/or logic 40 monitors a processing level associated with a downstream device. At decisional block 502, a determination is made whether the processing level has fallen below a predetermined threshold. If the processing level of the downstream device has not fallen below a predetermined threshold, the method proceeds to block 504, where the processing level of the downstream device continues to be monitored. If the processing level associated with the downstream device has fallen below a predetermined threshold, the method proceeds to block 506, where a lane width re-negotiation operation associated with the downstream device is initiated (e.g., completing pending transactions, saving registers and a state of the device, and communicating with the upstream device to re-negotiate to a reduced lane width). In the embodiment illustrated in FIG. 5, the lane width is reduced in response to detecting a decreased processing level. However, it should be understood that in response to detecting an increased processing level or demand, a re-negotiation operation is performed to dynamically increase the lane width.

Thus, embodiments of the present invention provide dynamic PCI express bus lane width re-negotiation in response to a variety of different power-related events associated with computer system 12. For example, in response to a rising and/or elevated temperature condition (e.g., due to an increased processing level and/or otherwise), a change in power supply mode, a change in processing level and/or processing requirements, embodiments of the present invention automatically re-negotiate and/or re-train a PCI express bus lane width to either increase or decrease a lane width based on the event.

It should be understood that in the described methods, certain functions may be omitted, accomplished in a sequence different from that depicted in FIGS. 3-5, or performed simultaneously or in combination. Also, it should be understood that the methods depicted in FIGS. 3-5 may be altered to encompass any of the other features or aspects of the invention as described elsewhere in the specification. Further, embodiments of the present invention may be implemented in software and can be adapted to run on different platforms and operating systems. In particular, functions implemented by control module 38, operating system 36 and/or logic 40, for example, may be provided as an ordered listing of executable instructions that can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions. In the context of this document, a "computer-readable medium" can be any means that can contain, store, communicate, propagate or transport the program for use by or in connection with the instruction execution system, apparatus, or device. The computer-readable medium can be, for example, but is not limited to, an electronic, magnetic, optical, electromagnetic, infrared, or semi-conductor system, apparatus, device, or propagation medium.

What is claimed is:

1. A dynamic lane management system, comprising:
at least one downstream device of a computer system configured to dynamically initiate a lane width re-negotiation operation with at least one upstream device of the computer system in response to a detection of a user input specifying a desired amount of battery time associated with the computer system.

2. The system of claim 1, wherein the at least one downstream device is configured to initiate the lane width re-negotiate operation in response to a change in the power supply mode of the computer system.

3. The system of claim 1, wherein the at least one downstream device is configured to initiate the lane width re-negotiate operation in response to detecting a change from an alternating current (AC) power mode to a direct current (DC) power mode.

4. The system of claim 1, wherein the at least one downstream device is configured to initiate the lane width re-negotiate operation in response to a temperature of the computer system exceeding a predetermined threshold.

5. The system of claim 1, wherein the at least one downstream device is configured to complete a pending transaction before initiating the lane width re-negotiation operation.

6. The system of claim 1, wherein the at least one downstream device is configured to save a state of the at least one downstream device before initiating the lane width re-negotiation operation.

7. The system of claim 1, wherein the at least one downstream device is configured to transmit a hot reset signal to the upstream device to initiate the lane width re-negotiation operation.

8. The system of claim 1, wherein the at least one downstream device is configured to transmit a retrain link signal to the upstream device to initiate the lane width re-negotiation operation.

9. The system of claim 1, wherein the at least one downstream device is configured to re-negotiate to a reduced lane width.

10. The system of claim 1, further comprising a control module configured to monitor a temperature of the computer system.

11. The system of claim 1, wherein the lane width re-negotiation operation configures a predetermined lane width correlating to the desired amount of battery time.

12. A dynamic lane management system, comprising:
a control module of a computer system configured to detect a user input specifying a desired amount of battery time associated with the computer system and dynamically initiate a lane width re-negotiation operation between at least one downstream device of the computer system and at least one upstream device of the computer system in response to detecting the user input.

13. The system of claim 12, wherein the control module is configured to monitor a temperature of the computer system.

14. The system of claim 12, wherein the control module is configured to initiate the lane width re-negotiation in response to a temperature of the computer system exceeding a predetermined threshold.

15. The system of claim 12, wherein the control module is configured to initiate the lane width re-negotiation in response to a reduced processing level of the at least one downstream device.

16. The system of claim 12, wherein the control module is configured to actuate at least one switch to change a lane width associated with the at least one downstream device.

17. The system of claim 12, wherein the control module is configured to re-negotiate to a reduced lane width corresponding to the at least one downstream device.

18. A dynamic lane management method, comprising:
detecting a user input specifying a desired amount of battery time associated with a computer system; and
dynamically initiating a lane width re-negotiation operation between at least one upstream device of the computer system and at least one downstream device of the computer system in response to detecting the user input.

19. The method of claim 18, further comprising transmitting a hot reset signal to initiate the lane width re-negotiation operation.

20. The method of claim 18, further comprising transmitting a retrain link signal to initiate the lane width re-negotiation operation.

21. The method of claim 18, further comprising actuating at least one switch to change a lane width between the at least one downstream device and the at least one upstream device.

22. The method of claim 18, further comprising initiating the lane width re-negotiation operation in response to detecting a change in a processing level of the at least one downstream device.

23. The method of claim 18, further comprising initiating the lane width re-negotiation operation in response to detecting a temperature of the computer system exceeding a predetermined threshold.

24. The method of claim 18, further comprising initiating the lane width re-negotiation operation in response to detecting a change in a power supply mode of the computer system.

25. The method of claim 18, further comprising reducing a lane width between the at least one downstream device and the at least one upstream device in response to detecting a temperature condition.

26. The method of claim 18, further comprising receiving a user request to initiate the lane width re-negotiation operation between the at least one upstream device and the at least one downstream device.

27. The method of claim 18, further comprising receiving a user request to reduce a lane width between the at least one upstream device and the at least one downstream device.

28. A tangible computer-readable medium having stored thereon an instruction set to be executed, the instruction set, when executed by a processor, causes the processor to:
- detect a user input specifying a desired amount of battery time associated with a computer system; and
- dynamically initiate a lane width re-negotiation operation between at least one upstream device of the computer system and at least one downstream device of the computer system in response to detecting the user input.

29. The tangible computer-readable medium of claim 28, wherein the instruction set, when executed by the processor, causes the processor to initiate the lane width re-negotiate operation in response to a change in the power supply mode of the computer system.

30. The tangible computer-readable medium of claim 28, wherein the instruction set, when executed by the processor, causes the processor to initiate the lane width re-negotiate operation in response to a temperature of the computer system exceeding a predetermined threshold.

31. The tangible computer-readable medium of claim 28, wherein the instruction set, when executed by the processor, causes the at least one downstream device to complete a pending transaction before initiating the lane width re- negotiation operation.

32. The tangible computer-readable medium of claim 28, wherein the instruction set, when executed by the processor, causes the processor to initiate the lane width re-negotiate operation in response to detecting a reduced processing level of the at least one downstream device.

* * * * *